UNITED STATES PATENT OFFICE.

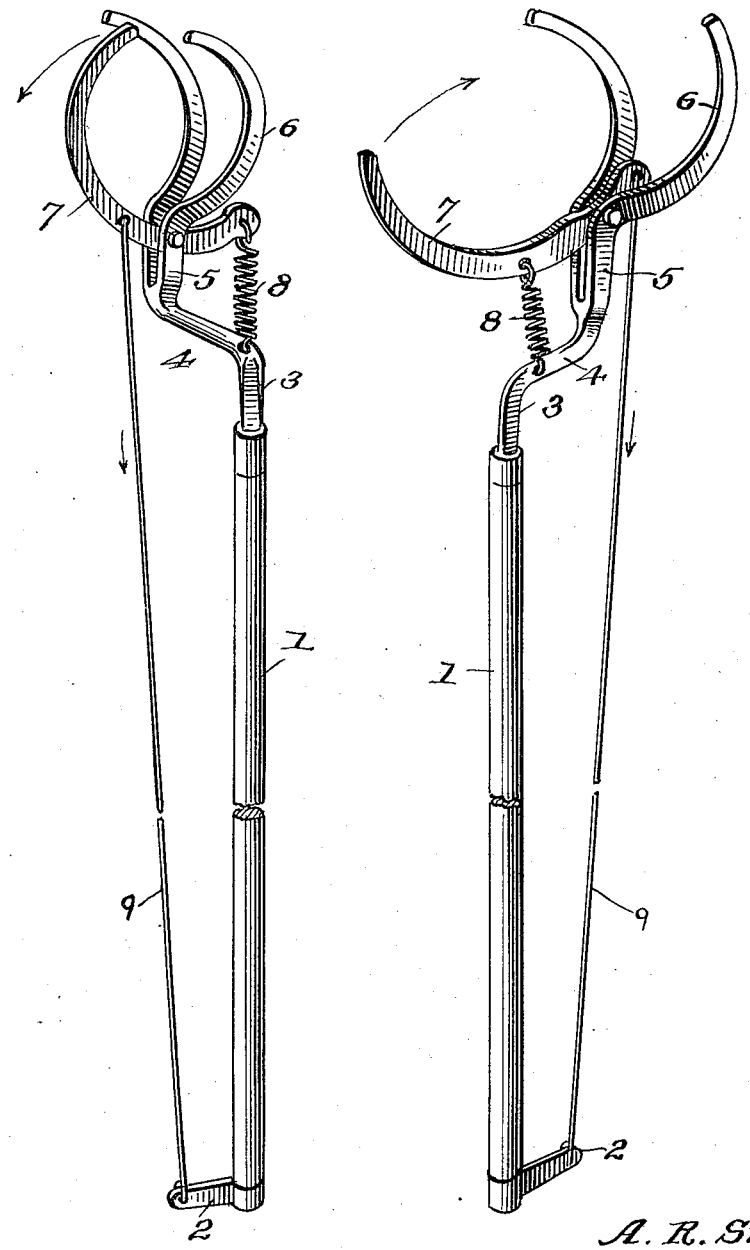

ALEXANDER R. SHAW, OF BILLINGS, MONTANA.

FRUIT-PICKER.

1,046,116.  Specification of Letters Patent.  Patented Dec. 3, 1912.

Application filed April 25, 1912. Serial No. 693,124.

*To all whom it may concern:*

Be it known that I, ALEXANDER R. SHAW, citizen of the United States, residing at Billings, in the county of Yellowstone and State of Montana, have invented certain new and useful Improvements in Fruit-Pickers, of which the following is a specification.

This invention has relation to fruit pickers especially adapted to be used for gathering large sized fruit as, for instance, apples and oranges, etc.

The device has for its object to provide a simple means easily and quickly operated for the purpose of pulling fruit of the character indicated from the stems or branches upon which it hangs.

With this object in view, the device includes a shank which includes a pair of claws. A claw is pivoted to the shank between the first-mentioned claws, and a spring connects at one end with the pivoted claw and at its other end with the shank. The shank is mounted upon a staff, and a lug is located at the lower end of the staff. A flexible member is connected at one end with the lug and at its other end with the pivoted claw. When the said flexible member is drawn toward the staff it swings the pivoted claw whereby it is moved with relation to the claws which are fixed to the shank, and by this movement the fruit is grasped and may be readily pulled from the stems or branches to which it is attached.

For a full understanding of the invention, reference is to be had to the following description and accompanying drawings in which:

Figure 1 is a perspective view of one form of the fruit picker; Fig. 2 is a perspective view of another form of the same.

Corresponding and like parts are referred to in the following description and indicated in all the views of the accompanying drawing by the same reference characters.

As illustrated in the accompanying drawing, the picker consists of a staff 1 to the lower end of which is attached an outstanding lug 2. A shank 3 is inserted in the upper end of the staff 1 and is provided with an angularly disposed portion 4. This portion 4 is carried up approximately parallel, as at 5, with the body portion of the shank and is then bifurcated and continued into curved claws 6. A claw 7 is pivoted between the claws 6 to the shank 3, and a spring 8 is connected at one end with the claw 7 and at its other end with the shank 3 approximately at the point of juncture between the angularly disposed portion and the body portion thereof. A wire, or other flexible member, is connected at one end with the pivoted claw 7 and at its other end with the lug 2. This wire extends approximately parallel with the staff 1 and, consequently, when it is pressed toward the staff it will swing the pivoted claw 7 in opposition to the spring 8.

As illustrated in Fig. 1, the wire 9 is connected with the pivoted claw at a point between the pivotal point of the said claw 7 and the free end thereof. In this form of the device, the tension of the spring 8 is such as to hold the free end of the claw 7 toward the ends of the claws 6; therefore when the wire is drawn toward the staff 1, the free end of the claw 7 is moved away from the ends of the claws 6, and, consequently, sufficient room is provided the fruit to enter between the claws, and as soon as pressure is removed from the wire 9 the tension of the spring 8 comes into play and the free end of the claw 7 moves toward the claws 6 and the fruit is grasped, and by pulling down upon the device it is removed from the branch that supports it.

In the form of the device as illustrated in Fig. 2, the wire 9 is connected with the claw 7 at a point opposite its pivotal connection with the shank 3 from that to which the spring 8 is connected, and therefore in this form of the device when the claws are placed about the hanging fruit and the wire is pressed toward the staff 1, the claw 7 swings toward the claws 6 and the fruit is grasped, and then by pulling down upon the staff it is removed from the branch. As soon as the pressure is removed from the wire 9 the tension of the spring 8 comes into play and the free end of the claw 7 is swung away from the claws 6 and the fruit is liberated and the members assume their normal positions.

In both forms of the invention the device is what is generally known as a long arm fruit picker, for the staff is sufficiently long to permit a person to stand upon the ground and gather the fruit from the highest limbs upon the trees.

Having described the invention, what is claimed as new is:

1. A fruit picker comprising a staff having an outstanding lug, a shank secured to the staff and terminating in spaced claws, a claw pivoted between the first-mentioned claws, a spring connected with the pivoted claw and the shank, and a flexible member connected with the pivoted claw and the lug, the pivot of the claw being between the spring and the flexible member.

2. A fruit picker comprising a staff having an outstanding lug, a shank attached to the staff and terminating in spaced claws, a claw pivoted to the shank between the said spaced claws, a spring connected with the pivoted claw and the staff, and a flexible member connected with the pivoted claw and the lug, the pivot of the claw being between the spring and the flexible member.

In testimony whereof I affix my signature in presence of two witnesses.

ALEXANDER R. SHAW. [L. S.]

Witnesses:
J. L. DAVIS,
M. L. HONRELL.

---

Copies of this patent may be obtained for five cents each, by addressing the "Commissioner of Patents, Washington, D. C."